A. H. BARTLETT.
Condensing Cover.
No. 23,437.
Patented April 5, 1859.
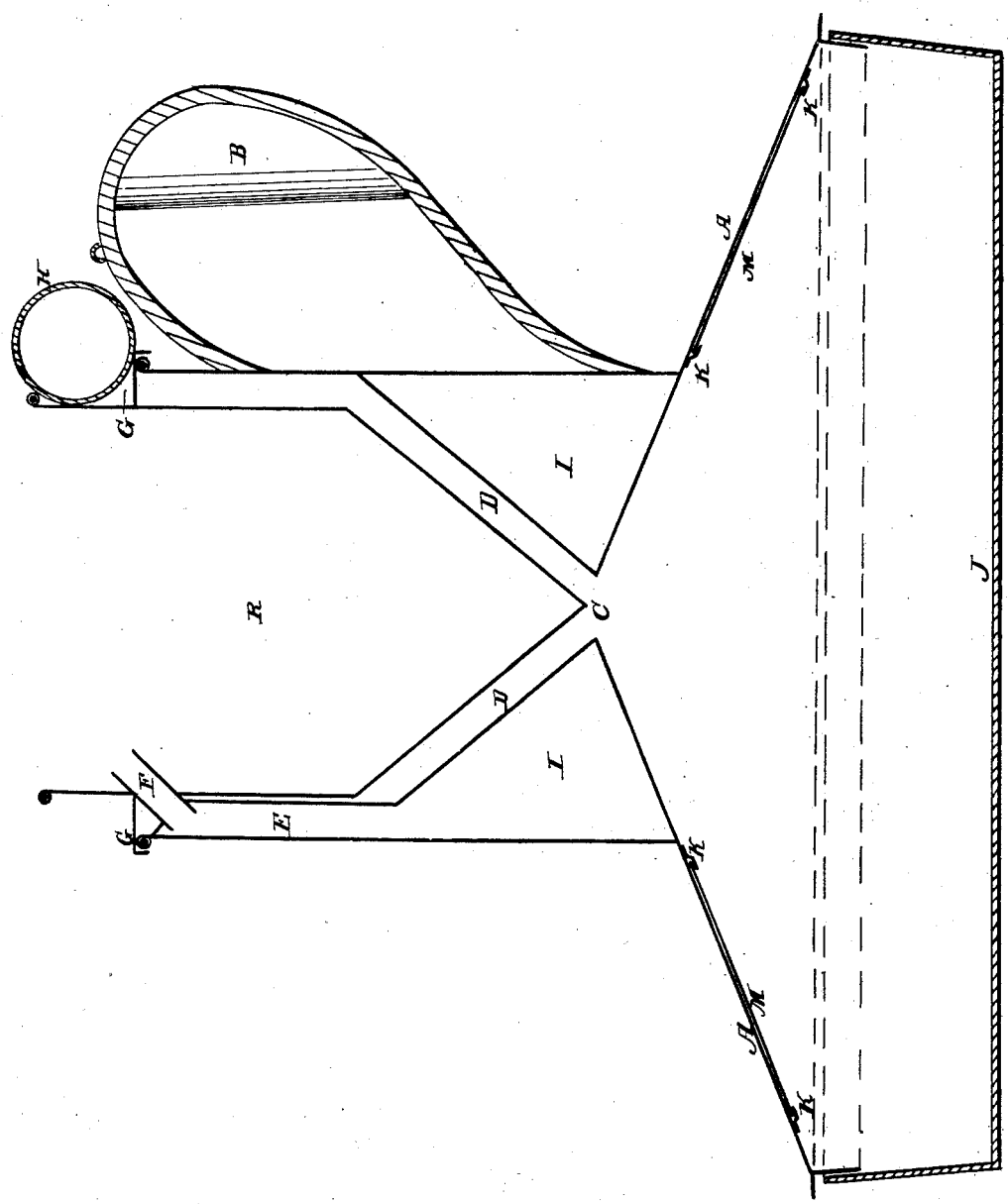
Witnesses:
Inventor:

UNITED STATES PATENT OFFICE.

ABEL H. BARTLETT, OF SPUYTEN DUYVIL, NEW YORK.

CONDENSING-COVER.

Specification of Letters Patent No. 23,437, dated April 5, 1859.

*To all whom it may concern:*

Be it known that I, ABEL H. BARTLETT, of Spuyten Duyvil, in the county of Westchester and State of New York, have invented certain new and useful improvements in condensing-covers for the purpose of retaining while cooking the aroma and nutritious qualities of meats, fruits, vegetables, coffee, and other articles of like nature; and I do hereby declare that the following is a full, clear, and exact description of the same, reference being had to the annexed drawing, making a part of this specification, in which the figure is a sectional view of my condensing cover.

Similar letters of reference indicate corresponding parts in the figure.

To enable others skilled in the art to fully understand and construct my invention I will proceed to describe it.

A, A represents the lower portion of the cover, B handle, I, I, lower water reservoir, R, upper water reservoir, H handle, G, G, flange projecting over the lower reservoir with its edge turned down to keep the reservoirs in position, F overflow pipe, E pipe opening into and leading to the reservoir I, I, C opening through the reservoir I, I, and leading to the space D, D, between the reservoirs I, I, and R.

M, M, are pieces of isinglass fastened under the openings in the cover by means of the flanges K, K,—K, K.

J represents a frying pan showing the manner of fitting the cover to it.

The operation is as follows: Cold water is poured into the reservoir R, until it overflows at F, and fills the reservoir I, I, by falling through the pipes F, and E. The articles to be cooked are then placed over the fire in the vessel J, when the cover is placed firmly on as shown in the figure. When the steam and aroma arise it is partially condensed by coming in contact with the cool surface of the lower portion of the reservoir I, I. Whatever remains uncondensed passes through the opening C, into the space D, D, impinging against the reservoir R, where it is fully condensed and falls back into the vessel J. Should more water be needed in the vessel J, (this will be readily seen without removing the cover by looking through the isinglass M, M,) it is supplied by pouring it into the reservoir R, until it overflows and falls through the opening at C.

I claim—

The reservoirs I, I, and R, the pipes F, and E, when made and arranged substantially as and for the purposes specified.

In witness whereof I have hereunto subscribed my name this 24th day of February eighteen hundred and fifty nine.

ABEL H. BARTLETT.

In presence of—
SAM. P. LEWIS,
AMASA C. MOORE.